United States Patent
Yamada

[11] Patent Number: 6,036,163
[45] Date of Patent: Mar. 14, 2000

[54] VIBRATION-PROOF SYSTEM FOR A MODEL-CRAFT ENGINE

[75] Inventor: Naohisa Yamada, Inuyama, Japan

[73] Assignee: Yamada Mfg. Co., Ltd., Inuyama, Japan

[21] Appl. No.: 09/058,766

[22] Filed: Apr. 11, 1998

[51] Int. Cl.[7] .................................................. B64D 27/00
[52] U.S. Cl. ........................... 248/557; 267/153; 244/54
[58] Field of Search ................................. 267/136, 141.1, 267/141.2, 141.3, 152, 153; 248/554–557; 244/54

[56] References Cited

U.S. PATENT DOCUMENTS

| | | | |
|---|---|---|---|
| 4,634,081 | 1/1987 | Chee | 244/54 |
| 5,065,959 | 11/1991 | Bhatia et al. | 244/54 |
| 5,303,896 | 4/1994 | Sterka | 248/557 |
| 5,836,545 | 11/1998 | Arlton et al. | 244/60 |

*Primary Examiner*—Chris Schwartz
*Attorney, Agent, or Firm*—Kenneth W. Float

[57] ABSTRACT

A system equipped with elastic vibration absorbers whose elastic elements, capable of absorbing engine rotational vibrations, are placed and affixed between the supports of the engine main body along the same axis as that of the output axle and the structure for fastening the engine main body to the airframe, and with a vibration absorber-damper equipped with an arm affixed on the support of the engine main body and another arm coupled to the structure for fastening one of the aforementioned elastic vibration absorbers in such a way that these arms, separable and opposing, are positioned and pivoted at the axis of the output axle in a plane perpendicular to this axis, and with a damping member, installed between these arms, for absorbing engine vibrations and recoils occurring in the elastic bodies. The system absorbs engine vibrations and prevents them from propagating into the airframe by means of elastic vibration absorbers installed at the supports of an engine main body and of a vibration absorber-damper comprised of a damping member installed in conjunction with the elastic vibration absorbers.

10 Claims, 3 Drawing Sheets

VIBRATION-PROOF SYSTEM FOR A MODEL-CRAFT ENGINE

BACKGROUND

The present invention relates generally to vibration dampening systems, and more particularly, to vibration-proof systems that are mounted on model-craft engines to absorb and dampen vibrations occurring in engines of model-craft airplanes, or the like, so as to dampen vibrations before they propagate into airframes.

A conventional model-craft airplane is furnished with a single-cylinder model-craft engine that is ignited for implosion once every two revolution cycles, which constantly causes irregularity in the piston's longitudinal motion and other motion, which in turn causes the engine to vibrate constantly in its longitudinal direction and rotational directions. Conventionally, this type of single-cylinder engine is installed on the airframe of an airplane by fastening the mounting portion of the engine main body onto the airframe with metal fittings directly or by placing elastic material, such as rubber, or springs between them.

As a conventional remedy for reducing such engine vibrations, elastic material, such as rubber, is sometimes used at the mount when fastening the engine main body. In this method, soft rubber would prove effective during high-speed revolution, while the engine main body would tend to sway widely during low-speed revolution, which involves large torque fluctuations. For example, the engine could not be prevented from vibrating widely during idling, thus yielding a counter result. If the rubber is too stiff, vibrations could not be absorbed while the engine is turning, thus yielding a shortcoming in the engine's wild vibrations during idling or other operation that are bound to subject the airplane airframe and other equipment to sustaining abnormal operations and malfunctions as well as an in-flight shortcoming in the airframe balance that is bound to be lost unless engine vibrations are absorbed.

Accordingly, it is an objective of the present invention to provide for vibration-proof systems that are mounted on model-craft engines to absorb and dampen vibrations occurring in engines of model-craft airplanes, or the like, so as to dampen vibrations before they propagate into airframes.

SUMMARY OF THE INVENTION

To accomplish the above and other objectives, the present invention provides for a vibration-proof system for a model-craft engine that comprises elastic vibration absorbers, containing elastic bodies, such as rubber bands, disposed between the supports of the engine main body and the mount of the airframe, and comprises a vibration absorber-damper between the support arm of the engine main body and the arm of the fastening means on the airframe. The system absorbs and dampens engine vibrations by means of the elastic bodies in the elastic vibration absorbers and the damper in the vibration absorber-damper, which dampen airframe vibrations during low-speed revolution and high-speed revolution. This, in turn, allows one to maintain stable flights and prevent malfunctions and other ill effects from occurring. The present invention also provides for a vibration-proof system for a model-craft engine capable of absorbing and damping vibrations more effectively by furnishing the system with rubber-containing elastic vibration absorbers at two locations, fore and aft, in the direction of the axle of the engine main body and by equipping the system with the vibration absorber-damper in conjunction with the aft elastic vibration absorber.

The vibration-proof system is unique in that it is furnished with elastic vibration absorbers whose elastic bodies, capable of absorbing engine vibrations, are placed and affixed between the supports of the engine main body along the same axis as that of the output axle and the means for fastening the engine main body to the airframe, and with a vibration absorber-damper equipped with an arm fixed on the support of the engine main body and another arm coupled to the means for fastening one of the aforementioned elastic vibration absorbers in such a way that these arms, separable and opposing, are positioned and pivoted at the axis of the output axle in a plane perpendicular to this axis, and with a damping means, installed between these arms, for absorbing engine vibrations and recoils occurring in the elastic bodies, so that engine vibrations can be absorbed by the vibration absorbers and the vibration absorber-damper.

The present invention effectively allows the elastic vibration absorbers to absorb vibrations occurring in an engine in its longitudinal direction and rotational directions during low-speed revolution or other operation and the vibration absorber-damper to absorb and damp rotational vibrations and recoils occurring in the elastic bodies. Therefore, since engine vibrations can be absorbed, one can prevent vibrations from propagating into the airframe, which in turn will allow one to maintain more stable flights and prevent malfunctions and abnormal operations from occurring in various devices of the airplane.

The vibration-proof system for a model-craft engine of the present invention, is also unique in that it is furnished with elastic vibration absorbers whose elastic bodies, capable of absorbing engine vibrations, are placed and affixed between the supports of the engine main body at the fore and aft sides of the engine main body along the same axis as that of the output axle and the means for fastening the engine main body to the airframe, and with a vibration absorber-damper equipped with an arm fixed on the support at the aft side of the engine main body and another arm coupled to the means for fastening one of the aforementioned elastic vibration absorbers in such a way that these arms, separable and opposing, are positioned and pivoted at the axis of the output axle in a plane perpendicular to this axis, and with a damping means, installed between these arms, for absorbing engine vibrations and recoils occurring in the elastic bodies, so that engine vibrations can be absorbed by the elastic vibration absorbers located at the fore and aft sides of the engine main body and by the vibration absorber-damper located at the aft side of the engine main body.

The present invention employs the elastic vibration absorbers, coupled at the two fore and aft locations in the direction of the output axle of the engine main body, in combination with the vibration absorber-damper, and thereby effectively allows the fore and aft elastic vibration absorbers to absorb the engine longitudinal and rotational vibrations during low-speed revolution or other operation, while likewise allowing the vibration absorber-damper, comprised of a damping means, such as an oil-pressure damper and an air damper, coupled between the am of the means for fastening the elastic vibration absorber fixed on the airframe and the arm installed on the engine main body, to absorb and damp rotational vibrations and recoils occurring in the elastic body: one can thus prevent vibrations from propagating into the airframe, which in turn will allow one to maintain more stable flights and prevent malfunctions and abnormal operations from occurring in various devices of the airplane.

The present invention embodies a system in which the aforementioned elastic vibration absorbers are furnished with elastic bodies, such as rubber bands, placed and affixed between the supports of the engine main body and the coupler outer rings of the means for fastening the engine main body to the airframe and in which the aforementioned vibration absorber-damper is constituted by linking the arm fixed on the support of the engine main body and the arm coupled to the coupler outer ring at the outer circumference of one of the elastic vibration absorbers by means of a damper, such as an oil cylinder and an air cylinder.

The present invention effectively allows the elastic bodies, such as rubber bands, to absorb the engine's longitudinal and rotational vibrations during low-speed revolution and the dampers to absorb and damp rotational vibrations and recoils occurring in the elastic material. Thus, the system is capable of absorbing and damping engine vibrations completely.

Accordingly, it is an object of this invention to provide a means for extending the function of an existing wall switch (or its equivalent) in a residence or other building, without the necessity for rewiring, so that, in its extended function, the existing wall switch switches AC power available at one or more additional remote AC electrical outlets. Those remote outlets can be in the same room, in another room, or in a nearby building.

It is another object of the present invention is to provide a means wherein the function of two or more existing wall switches (or equivalent switching devices) can additionally switch control AC power at one or more additional AC electrical outlets.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
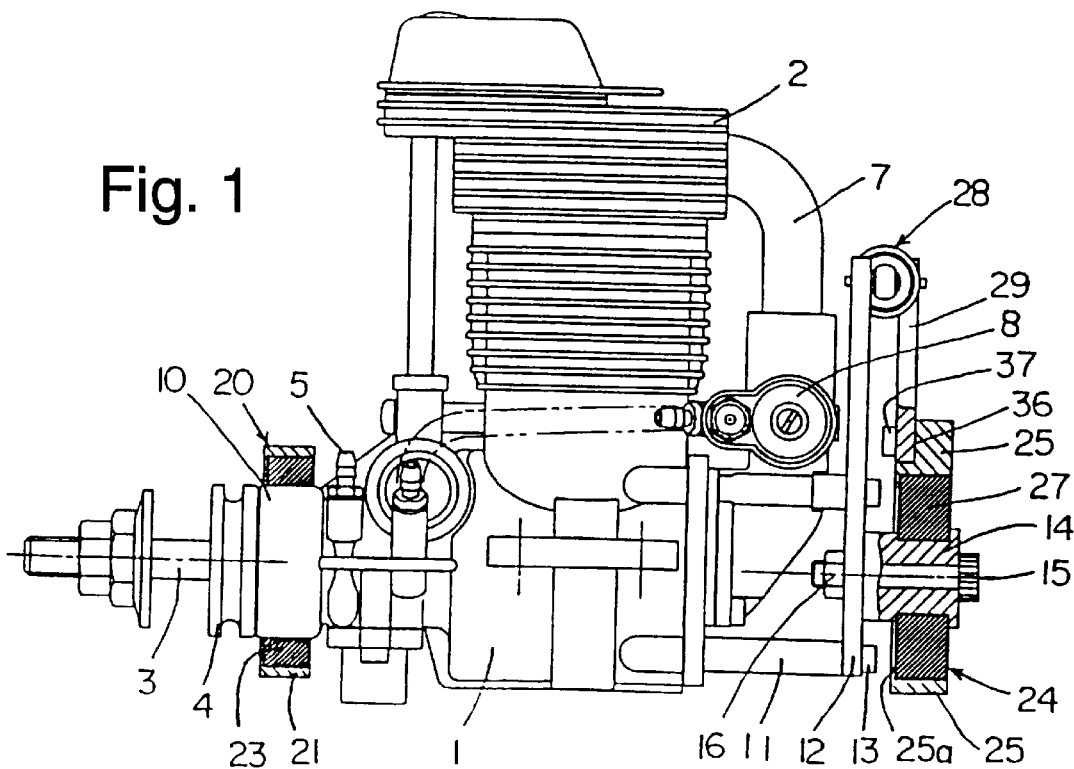
FIG. 1 is a partially fragmentized front view of a model-craft engine equipped with a vibration-proof system in accordance with the principles of the present invention.
Figure 2:
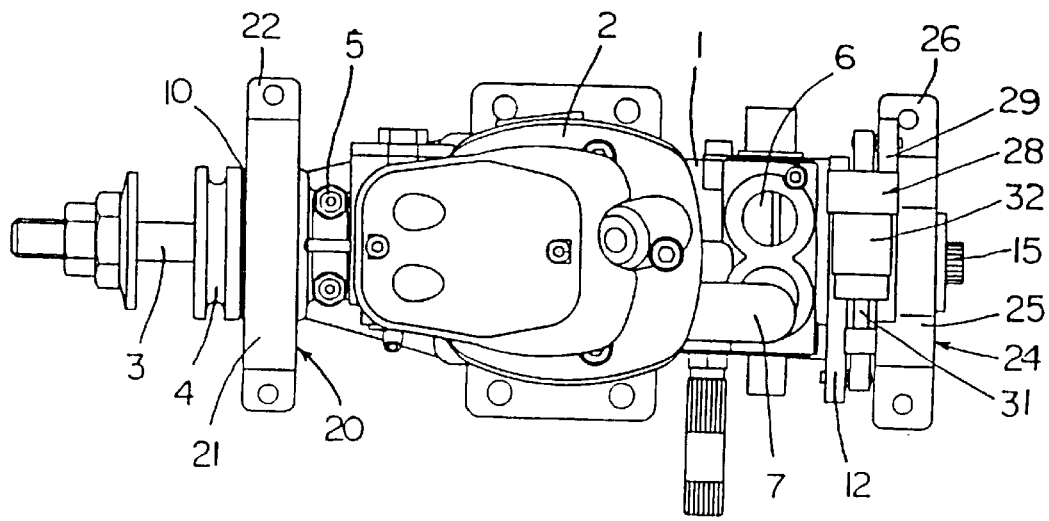
FIG. 2 is a to p view of the vibration-proof system.
Figure 3:
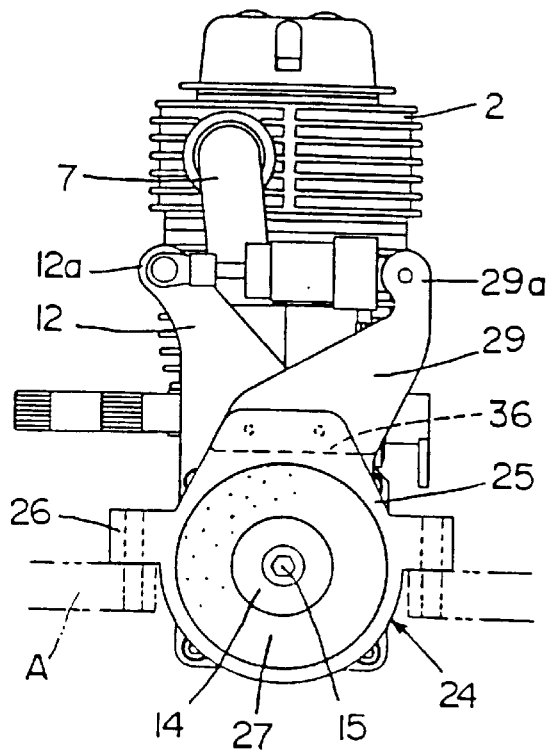
FIG. 3 is a right-side view of the vibration-proof system.
Figure 4:
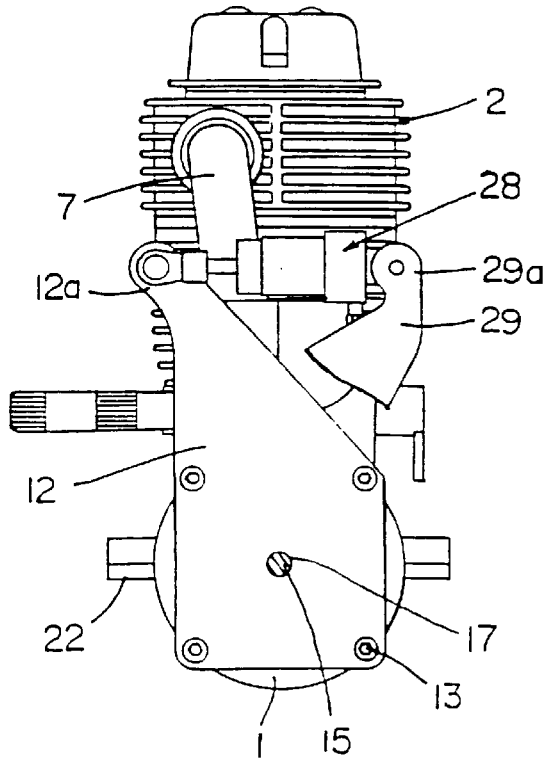
FIG. 4 is a right-side view of the vibration-proof system from which the support furnished with the aft elastic vibration absorber has been removed.
Figure 5:
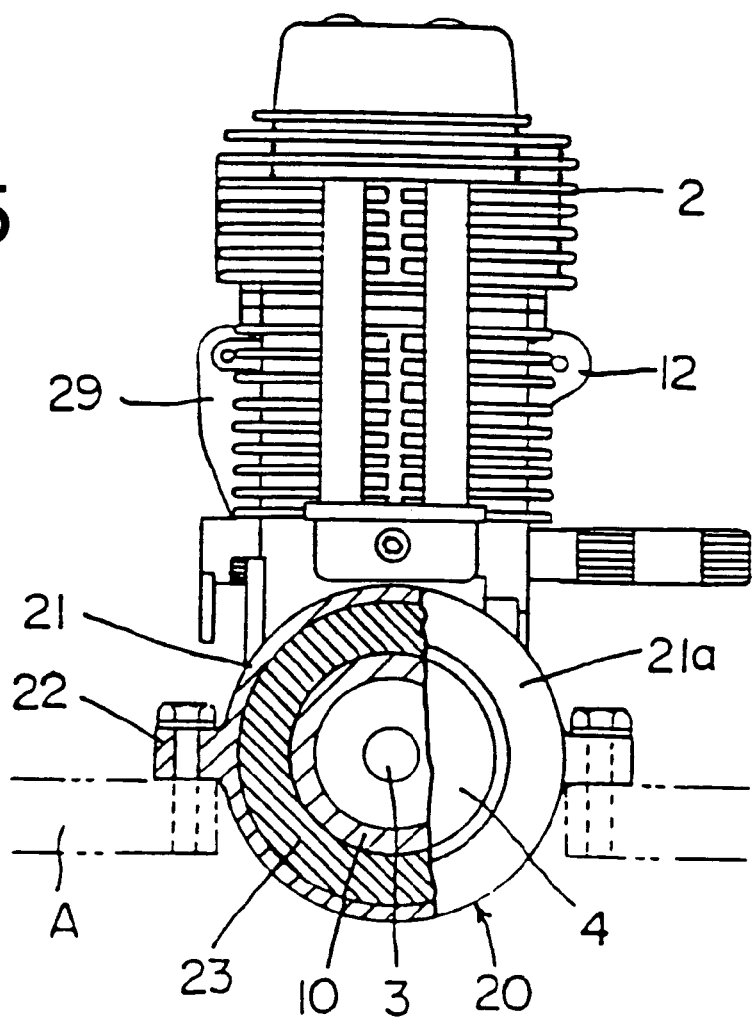
FIG. 5 is a partially fragmentized left-side view of the vibration-proof system.

In FIG. 1 through FIG. 5, an engine main body 1 for a single-cylinder model-craft airplane is shown, and is furnished with a cylinder head 2, an output axle 3, a pulley 4, a fuel supply port 5, a carburetor 6, a fuel-mixture pressure relay tube 7 linking the crankcase to the combustion chamber for the cylinder, a fuel-mixture adjuster valve 8, a mounting portion 9, and other parts. The engine main-body configuration is not limited to that described in the above; it also includes those for a two-cycle engine, a four-cycle engine, and so forth. Designated by A is a mount for installing the engine main body 1 on the airframe of the model-craft airplane.

The support at the fore side in the direction of the axle 3 of the engine main body 1 is furnished with a ring support 10, installed in a plane perpendicular to the axle 3 at the front outer circumference of the output axle 3. An elastic vibration absorber 20, coupled to this ring support 10, is configured so that a rubber band 23 is placed and affixed, as a damping means for absorbing the engine's longitudinal and rotational vibrations, between the outer circumference of the ring support 10 and a metal coupler outer ring 21 fabricated to have a mounting portion 22 for fastening to the mount A of the airframe. On the other hand, the aft support of the engine main body 1 is configured so that a set of four support bars 11 are disposed in the direction of the axle 3 behind the main body 1 on the side of the fuel-mixture pressure relay tube 7, so that a metal arm 12, whose bottom portion is fabricated to be about as wide as the main body 1 and whose top portion is narrowed on one side, is positioned in a plane perpendicular to the axis of the output axle 3 and fastened by means of screws 13, and so that a support axle 14, fitted on the lower back surface of the arm 12 along the same axis as that of the output axle 3, is fastened by means of a bolt 15, inserted through the support axle center and the arm 12, and a nut 16. An elastic vibration absorber 24 coupled to this rear support axle 14 is configured so that a rubber band 27 is placed and affixed, as a damping means for absorbing the engine's longitudinal and rotational vibrations, between the outer circumference of the support axle 14 and a metal coupler outer ring 25 fabricated to have a mounting portion 26 for fastening to the mount A of the airframe. As shown in the drawing figures, the lower middle portion of the engine main body 1 is not affixed, namely, the engine main body 1 is fastened to the mount A of the airframe only at the fore and aft supports by means of the above-mentioned elastic vibration absorbers 20, 24, which are capable of absorbing and damping the operating engine's longitudinal and rotational vibrations evenly at their fore and aft locations.

The coupler outer rings 21, 25 are wide band-shaped rings made of metal, in which rubber bands 23, 27 of designated thicknesses are affixed between their inner surfaces and the outer circumferences of the supports 10, 14. Fabricated on these coupler outer rings 21, 25 are covers 21a, 25a for determining the locations of the rubber bands; also fabricated, at both middle sides, are the mounting portions 22, 26 for fastening to the mount A of the airframe. The rubber bands 23, 27, fabricated to be flexible and thick enough to absorb longitudinal and rotational vibrations, may be affixed by baking to the outer circumferences of the supports 10, 14 and to the coupler outer rings 21, 25, or joined by roughening the inner and outer circumferences of the rubber bands and thereby increasing the friction between the supports 10, 14 and the coupler outer rings 21, 25, or affixed by means of adhesive, so as not to allow the rubber bands placed between the coupler outer rings and the supports 10, 14 or support axles to turn around. The support axle 14 is fabricated to have a band-shaped indentation on its outer circumference, on which the rubber band 27 is set and affixed.

Coupled at the aft side of the aforementioned engine main body 1 are the metal arm 12 installed on the support and another metal arm 29 installed on an fastening means on the airframe, in such a way that these arms, pivoted at the same axis as that of the output axle 3, can be separable and opposing in a plane perpendicular to this axis. The arm 12, as mentioned in the above, is a wide-bottomed plate, whose top portion is narrowed on one side as a support 12a and whose bottom portion is fastened to the support bars 11 at four locations of the engine main body 1 by means of the screws 13, where the support axle 14, fitted on the arm's back surface, is fastened by means of the bolt 15, inserted through the center of the support axle and an opening 17 in the arm 12, and the nut 16. The bottom portion of the arm 29 is fabricated to match roughly the outer ring 25 in width, while the top portion is narrowed on one side as a support 29a, and this bottom portion is fastened to a mounting step 36 at the top portion of the outer ring 25 by means of a screw 37, where the aforementioned arms 12, 29, of the same height, are installed so that they can be opposing and separable.

Figure 6:
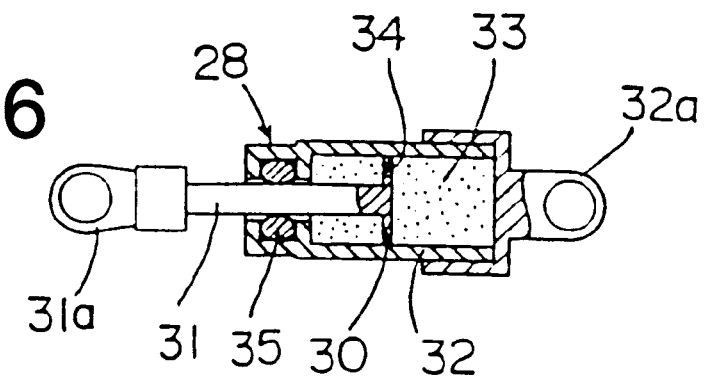
FIG. 6 is a cross section of an oil-pressure damper.

As shown in FIG. 6, installed as a damper between the two aforementioned arms 12, 29 is a vibration absorber-damper 28, which suppresses and reduces the engine's rotational vibrations and recoils occurring in the elastic body due to the aforementioned elastic device being subjected to rotational vibrations. An oil damper is mounted as this damper 28. The base end 31a of the rod 31 of the piston 30 of the oil damper 28 is pivoted, free to be turned, at the fulcrum of the support 12a at the tip of the arm 12 installed on the engine; the base end 32a of the rod 32 of the oil damper 28 is pivoted, free to be turned, at the fulcrum of the support 29a at the tip of the arm 29 installed on the airframe, where the cylinder 32 is fabricated to have an oil chamber 33 and where the piston 30, an orifice 34: the engine's rotational vibrations or recoils occurring in the elastic body, when exerted to the piston 30, will force oil in the oil chamber 33 to move through the orifice 34 between the right and left compartments of the piston, thus absorbing and damping engine vibrations. An oil seal 35 is coupled between the piston rod 31 and the cylinder 32 so that the oil inside the cylinder 32 does not leak. While, in he above-mentioned embodiment, an oil damper was employed as the damper 28, the configuration is not so limited: one may also use, for example, an air damper, a spring or the like for the damping means.

We shall explain the action of engine vibrations being absorbed and damped by the aforementioned rubber band 27 and the damper 28. While a single-cylinder engine produces vibrations during low-speed revolution, such as during idling, as well as during high-speed revolution and other operation, these vibrations can be absorbed by the elasticity in the rubber bands 23, 27 installed on the supports at both sides of the engine 1, and rotational vibrations and recoils occurring in the rubber bands 23, 27 will act on the oil-pressure damper 28 installed between the arm 29 and the arm 12, shifting the piston 30 back and forth inside the cylinder 32 and causing oil in the oil chamber 3 to move through the orifice 34 of the piston 30 between the right and left compartments, in which process the oil absorbs and damps engine vibrations.

While, in the above-mentioned embodiment, the elastic vibration absorbers 20, 24 are equipped to the fore and aft supports of the engine main body 1 and the vibration absorber-damper is furnished in conjunction with the aft support, the configuration is not so limited: one may also devise a system of absorbing and damping vibrations by configuring it so that the support at the fore side on the axle 3 of the engine main body 1 is fabricated to be freely moveable and so that the elastic vibration absorbers 20, 24 are installed only at the aft side and the vibration absorber-damper is installed in conjunction with these supports. This invention is not limited, by embodiment, to these formats: this invention can be embodied in various formats so long as they do essentially not depart from the scope of this invention.

Merits of the invention are as follows. The vibration-proof system for a model-craft engine is capable of absorbing engine vibrations during low-speed revolution and other operation by means of the elastic vibration absorbers 20, 24 furnished internally with elastic bodies, such as rubber bands, and of absorbing and damping engine vibrations and recoils in the elastic bodies by means of the vibration absorber-damper. Thus, a combined effect of the elastic vibration absorbers 20, 24 and the vibration absorber-damper enables the system to absorb engine vibrations not only during low-speed revolution but also during high-speed revolution, which allows one to prevent vibrations from propagating into the airframe, which in turn will allow one to maintain more stable flights and prevent malfunctions and abnormal operations from occurring in various devices of the airplane.

The invention embodies a system capable of absorbing longitudinal and rotational vibrations by means of the elastic vibration absorbers 20, 24 installed at the two fore and aft sides in the direction of the output axle 3 of the engine main body 1 and of absorbing and damping engine vibrations and recoils occurring in the elastic bodies by means of the vibration absorber-damper installed at the aft support of the engine main body 1: thus, a combined effect of the elastic vibration absorbers 20, 24 and the vibration absorber-damper enables the system to absorb and damp engine vibrations completely during low-speed revolution and high-speed revolution, which allows one to prevent vibrations from propagating into the airframe, which in turn will allow one to maintain more stable flights and prevent malfunctions and abnormal operations from occurring in various devices of the airplane.

The invention embodies a system capable of absorbing longitudinal and rotational vibrations occurring in the engine during low-speed revolution and other operation by means of elastic bodies, such as rubber bands, and of absorbing and damping rotational vibrations and recoils occurring in the elastic bodies by means of the damper, such as an oil-pressure damper. Thus, the system is capable of completely absorbing engine vibrations not only during low-speed revolution but also during high-speed revolution by means of the elastic bodies, such as rubber bands, and the damper, such as an oil-pressure damper.

Thus, vibration-proof systems that are mounted on model-craft engines to absorb and dampen vibrations occurring in engines of model-craft airplanes, or the like, so as to dampen vibrations before they propagate into airframes have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A vibration-proof system for a model-craft engine comprising:

elastic vibration absorbers, that are capable of absorbing engine vibrations disposed along an axis aligned with an output axle of the engine between supports of the engine and means for fastening the engine to an airframe; and a vibration absorber-damper having an arm fixable on one support of the engine and another arm coupled to means for fastening one of the elastic vibration absorbers, wherein the arms, separable and opposing, are positioned and pivoted at an axis of the output axle in a plane perpendicular to this axis, and comprising damping means, disposed between the arms, for absorbing engine vibrations and recoils occurring in the elastic bodies;

whereby engine vibrations are absorbed by the vibration absorbers and the vibration absorber-damper.

2. The system of claim 1 wherein the elastic vibration absorbers comprise rubber bands, disposed between the supports of the engine and coupler outer rings of the means for fastening the engine to the airframe, and wherein the vibration absorber-damper is constituted by linking the arm fixed on the support of the engine and the arm coupled to the coupler outer ring at an outer circumference of one of the elastic vibration absorbers by means of a damper.

3. The system of claim 1 wherein the elastic vibration absorbers comprise elastic bodies.

4. The system of claim 2 wherein the damper comprises an oil cylinder.

5. The system of claim 2 wherein the damper comprises an air cylinder.

6. A vibration-proof system for a model-craft engine comprising:

elastic vibration absorbers, that are capable of absorbing engine vibrations, disposed along an axis aligned with an output axle of the engine between supports of the engine located at fore and aft sides of the engine and means for fastening the engine to an airframe; and a vibration absorber-damper having an arm fixable on a support at the aft side of the engine and another arm coupled to means for fastening one of the elastic vibration absorbers, wherein the arms, separable and opposing, are positioned and pivoted at an axis of the output axle in a plane perpendicular to this axis, and comprising damping means, disposed between these arms, for absorbing engine vibrations and recoils occurring in the elastic bodies, so that engine vibrations are absorbed by the elastic vibration absorbers located at the fore and aft sides of the engine and by the vibration absorber-damper located at the aft side of the engine.

7. The system of claim 6 wherein the elastic vibration absorbers comprise rubber bands, disposed between the supports of the engine and coupler outer rings of the means for fastening the engine to the airframe, and wherein the vibration absorber-damper is constituted by linking the arm fixed on the support of the engine and the arm coupled to the coupler outer ring at an outer circumference of one of the elastic vibration absorbers by means of a damper.

8. The system of claim 6 wherein the elastic vibration absorbers comprise elastic bodies.

9. The system of claim 7 wherein the damper comprises an oil cylinder.

10. The system of claim 7 wherein the damper comprises an air cylinder.

* * * * *